United States Patent [19]
Allen et al.

[11] Patent Number: 5,379,220
[45] Date of Patent: Jan. 3, 1995

[54] ELECTRONIC STEERING CONTROL

[75] Inventors: William E. Allen; David A. Paul, both of Peoria, Ill.

[73] Assignee: Caterpillar Inc., Peoria, Ill.

[21] Appl. No.: 972,465

[22] PCT Filed: Jul. 29, 1991

[86] PCT No.: PCT/US91/05294

§ 371 Date: Jul. 29, 1991

§ 102(e) Date: Jul. 29, 1991

[51] Int. Cl.[6] .......................... B62D 5/04; B62D 1/00; B62D 6/00

[52] U.S. Cl. .................. 364/424.05; 180/140; 180/79.1; 180/142; 180/143; 280/91; 280/99

[58] Field of Search ............... 364/424.05; 180/140, 180/79.1, 141, 142, 143; 280/91, 99

[56] References Cited

U.S. PATENT DOCUMENTS

| | | | |
|---|---|---|---|
| 3,279,813 | 10/1966 | Linsay | 280/91 |
| 4,621,702 | 11/1986 | Kanazawa et al. | 180/140 |
| 4,660,844 | 4/1987 | Yamamoto et al. | 280/91 |
| 4,697,816 | 10/1987 | Kawamoto et al. | 280/91 |
| 4,705,135 | 11/1987 | Kawamoto et al. | 180/236 |
| 4,719,981 | 1/1988 | Miyoshi | 180/140 |
| 4,730,839 | 3/1988 | Miyoshi | 280/91 |
| 4,849,889 | 7/1989 | Morishita et al. | 364/424.05 |
| 4,917,204 | 4/1990 | Andrew et al. | 180/140 |
| 4,995,472 | 2/1991 | Hayashi et al. | 180/243 |
| 5,076,382 | 12/1991 | Vaughn et al. | 180/140 |
| 5,212,642 | 5/1993 | Tanaka et al. | 364/424.05 |
| 5,217,083 | 6/1993 | Bachhuber et al. | 180/140 |
| 5,267,160 | 11/1993 | Ito et al. | 364/424.05 |

FOREIGN PATENT DOCUMENTS

| | | |
|---|---|---|
| 0404422 | 12/1990 | European Pat. Off. . |
| 2557058 | 6/1985 | France . |
| 62-080174 | 9/1987 | Japan . |

*Primary Examiner*—Thomas G. Black
*Assistant Examiner*—Julie D. Day
*Attorney, Agent, or Firm*—Steven R. Janda

[57] ABSTRACT

Vehicles having front and rear steerable wheels (14,16) and a plurality of steering modes are commonly used in many applications. A vehicle (10) includes a steering input device (24) having a plurality of positions corresponding to the desired rate of turn of the vehicle (10) and a steering control (23) for changing the steering mode in which the vehicle (10) is operating. The steering control accomplishes (23) the steering mode transition while causing the rate of turn of the vehicle (10) to be substantially equal to the desired rate of turn throughout the transition.

17 Claims, 4 Drawing Sheets

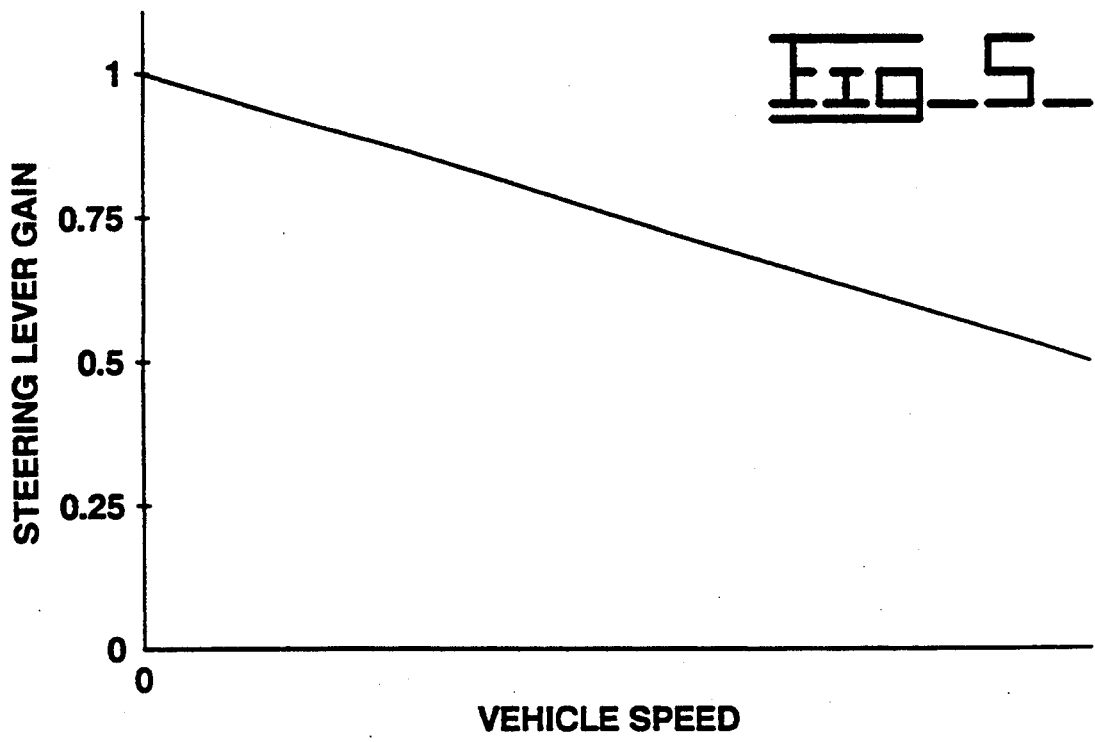
Fig_5_
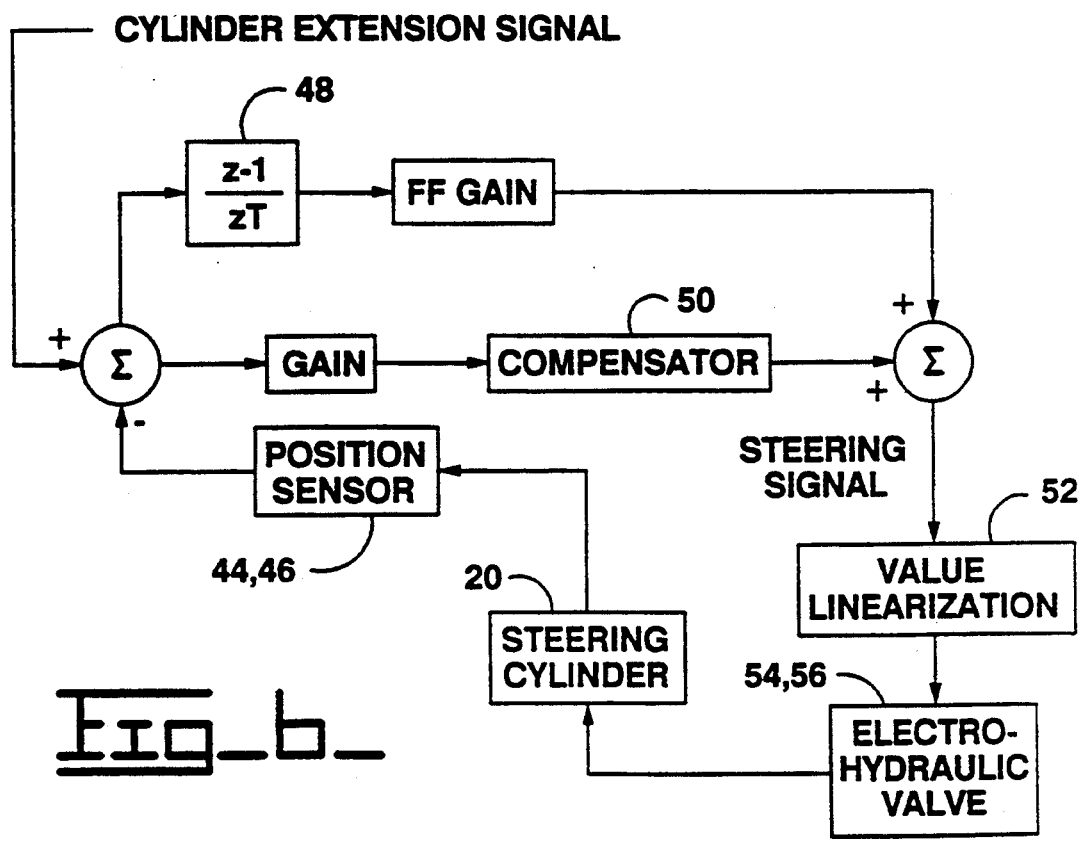
Fig_6_

ELECTRONIC STEERING CONTROL

TECHNICAL FIELD

This invention relates generally to vehicles having both front and rear steerable wheels and a plurality of steering modes and, more particularly, to an apparatus for controllably changing from one steering mode to another steering mode.

BACKGROUND ART

Vehicles often include both front and rear steerable wheels and a plurality of steering modes. The steering modes include, for example, modes in which the vehicle is steerable with only the front wheels, only the rear wheels, the front and rear wheels being steered in opposite directions, or the front and rear wheels being steered in the same direction. When the vehicle changes from one steering mode to another mode while it is in the process of turning, it is advantageous to prevent the vehicle's rate of turn from significantly deviating from the operator's desired rate of turn. As can be appreciated, if the rate of turn of the vehicle is sharply changed without any change in the operator's steering input, the vehicle can become unstable or can be steered in an unintended direction.

Early controls for vehicles having all-wheel steering, such as that disclosed in U.S. Pat. No. 3,279,813, issued to Linsay on Oct. 18, 1966, were hydromechanical and did not provide any means for maintaining the rate of turn of the vehicle when the operator changes from one steering mode to the next. Hence, each position of the steering wheel is associated with a plurality of rates of turn corresponding to each respective steering mode. For example, if the operator actuates the selector box to change from the front wheel steering mode to the cramp steering mode (front and rear wheels being steered in opposite directions), the front wheels are maintained in the direction they had previously been directed and the rear wheels are automatically turned in the opposite direction to an angle corresponding to the angle of turn of the front wheels. Therefore, as the rear wheels are turning, the vehicle's rate of turn is significantly increased even though the operator is not moving the steering wheel. Likewise, when the operator switches back to the front steering mode, the rear wheels will automatically return to a straight-ahead or neutral position. As the rear wheels straighten, the vehicle's rate of turn is significantly decreased even though the operator has not changed the position of the steering wheel. As noted above, these resulting changes in the vehicle's rate of turn can cause handling problems. This is particularly true at relatively high speeds; however, even at low speeds, such changes can be very disconcerting to the operator.

An alternative system used in automobiles is disclosed in U.S. Pat. No. 4,621,702, issued Nov. 11, 1986 to Kanazawa et al. While this system prevents the above mentioned control problems, the vehicle only changes steering modes while the position of the steering wheel is being changed. Therefore, if the steering wheel is maintained in a given position, the steering angle of the wheels is not changed. While this allows the operator to maintain control of the vehicle, the steering mode can only be changed in response to changes in the position of the steering wheel. For example, if the steering wheel is only turned a small amount, the vehicle will be in the crab steering mode (front and rear wheels are turned in the same direction). Likewise, if the steering wheel is turned a large amount, the vehicle will be in the cramp steering mode. When the steering wheel is in an intermediate position, the vehicle will be in an intermediate steering mode between the cramp mode and the crab mode. It is therefore impossible to place the vehicle in any steering mode other than those that are predetermined by the vehicle designer for a given amount of steering input.

The latter steering control is not suitable for use on construction vehicles, such as wheel type loaders, tractors, or trucks. Such a vehicle must allow the operator to change the steering mode in response to the application in which the vehicle is being used. The vehicle must be operable in a particular steering mode irrespective of the operator's steering input. To improve productivity, the vehicle should be capable of changing steering modes while the vehicle is operating. As noted in the discussion of the former steering control, however, such transitions should not cause the vehicle's rate of turn to significantly differ from the operator's steering input so that the vehicle does not become unstable.

The present invention is directed at overcoming one or more of the problems as set forth above.

DISCLOSURE OF THE INVENTION

In one aspect of the invention, an apparatus is provided for changing steering modes in a vehicle having a plurality of steerable wheels and a steering input device that is movably connected to the vehicle. The steering input device is movable to and between a plurality of positions corresponding to desired rates of turn for the vehicle. The vehicle includes a present steering mode and a device for selecting a desired steering mode. The vehicle is steerable with both a first subset of steerable wheels associated with the present steering mode and a second subset of steerable wheels associated with the desired steering mode. The apparatus at least partially transitions from steering exclusively with the first subset of steerable wheels to steering exclusively with the second subset of steerable wheels while the steering input device is in any of a plurality of positions. The apparatus causes the curvature of the vehicle's travel to be consistent with the desired rate of turn.

In another aspect of the present invention, a method is provided for changing steering modes in a vehicle having a plurality of steerable wheels and a steering input device that is movably connected to the vehicle. The steering input device is movable to and between a plurality of positions corresponding to desired rates of turn of the vehicle. The method includes the steps of selecting a desired steering mode, transitioning from a previous steering mode to one of an intermediate steering mode and the desired steering mode while the steering input device is in any of the plurality of positions, and causing the rate of turn of the vehicle to be substantially equal to the desired rate of turn throughout the transition.

The embodiment of the present invention provides a method and apparatus for controllably transitioning between a plurality of steering modes. Such transitions between steering modes include, by way of illustration and not limitation: transitioning from steering with only the front wheels to steering with both front and rear wheels or transitioning from steering with both front and rear wheels to steering with the rear wheels only. Throughout these transitions, the rate of turn of the vehicle is caused to be consistent with the desired rate of turn as determined by the position of a steering wheel or lever. Therefore, the rate of turn of the vehicle is not significantly changed without a corresponding change in the position of the steering wheel or lever even though the vehicle completely transitions from steering exclusively in one steering mode to steering exclusively in a second steering mode. This arrangement allows the operator or an automatic control system to change steering modes while the vehicle is being operated. The invention also includes other features and advantages that will become apparent from a more detailed study of the drawings and specification.

BRIEF DESCRIPTION OF THE DRAWINGS

For a better understanding of the present invention, reference may be made to the accompanying drawings, in which:

FIG. 4 is a block diagram of an embodiment of the steering control;

FIG. 5 is a graphical representation of the steering lever gain versus vehicle speed; and FIG. 6 is a block diagram of the closed loop control included in the embodiment of the invention illustrated in FIG. 4.

BEST MODE FOR CARRYING OUT THE INVENTION

Figure 1:
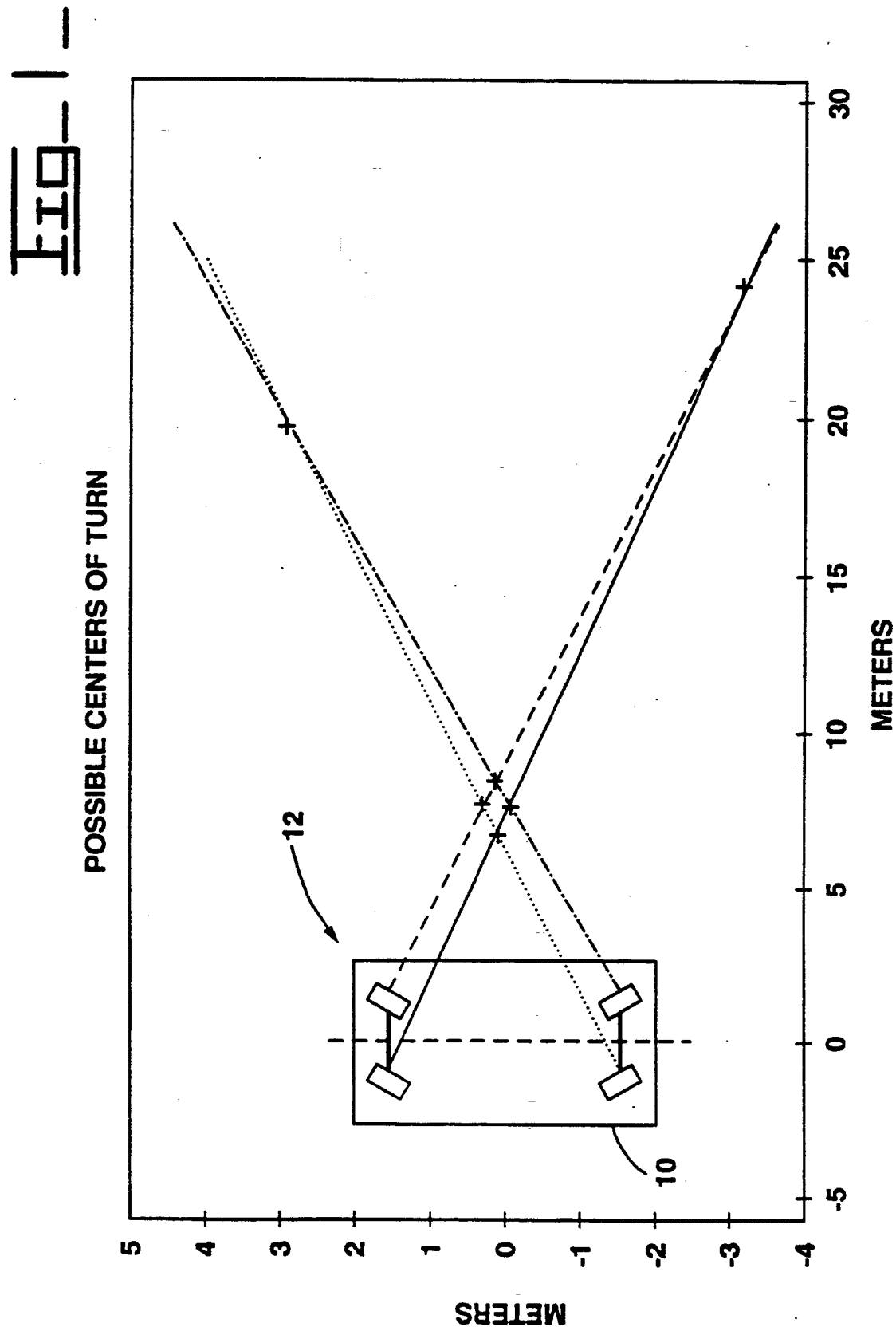
FIG. 1 illustrates the possible centers of turn for a vehicle.

A vehicle 10 having a plurality of steerable wheels 12 is shown in FIG. 1. In a preferred embodiment, the vehicle 10 includes four wheels, two of which being in the front and comprising a set of front steerable wheels 14 and two of which being in the rear and comprising a set of rear steerable wheels 16. Advantageously, the front and rear sets of wheels 14,16 are each controllably steered with an Ackerman steering apparatus as is well known in the steering art. While other steering apparatus would also be operable in connection with the instant invention, the dual Ackerman steering apparatus allows all four of the wheels to be steered with only two steering cylinders.

If there is no tire slippage when the vehicle 10 turns, each of the steerable wheels 12 are moving tangent to the curved path of the vehicle 10. As illustrated in FIG. 1, lines are drawn that are perpendicular to the path of each of the wheels 12. The lines emanating from the front wheels are not parallel since the Ackerman steering apparatus is designed to compensate for the fact that the wheel located on the outside of a given turn must travel substantially farther than the wheel on the inside of the turn. Due to the assumption of no slippage, the center of turn of the vehicle 10 can only be located at positions at which the perpendicular lines intersect. When steering with the front wheels 14 only, the center of turn is indicated in the lower right hand corner of FIG. 1 where the lines emanating from the front wheels 14 intersect. Similarly, when steering with the rear wheels 16 only, the center of turn is indicated in the upper right hand corner of FIG. 1. However, when the vehicle is steered in a cramp steering mode, in which the front wheels 14 are turned in one direction and the rear wheels 16 are turned in the opposite direction, the wheels must slip since the front and rear wheels 14,16 have different centers of turn. In the cramp steering mode, the true center of turn depends on the amount of slippage of each wheel 12 which is in turn a function of the dynamic loading of the vehicle 10, tire conditions, and soil conditions.

Figure 2:
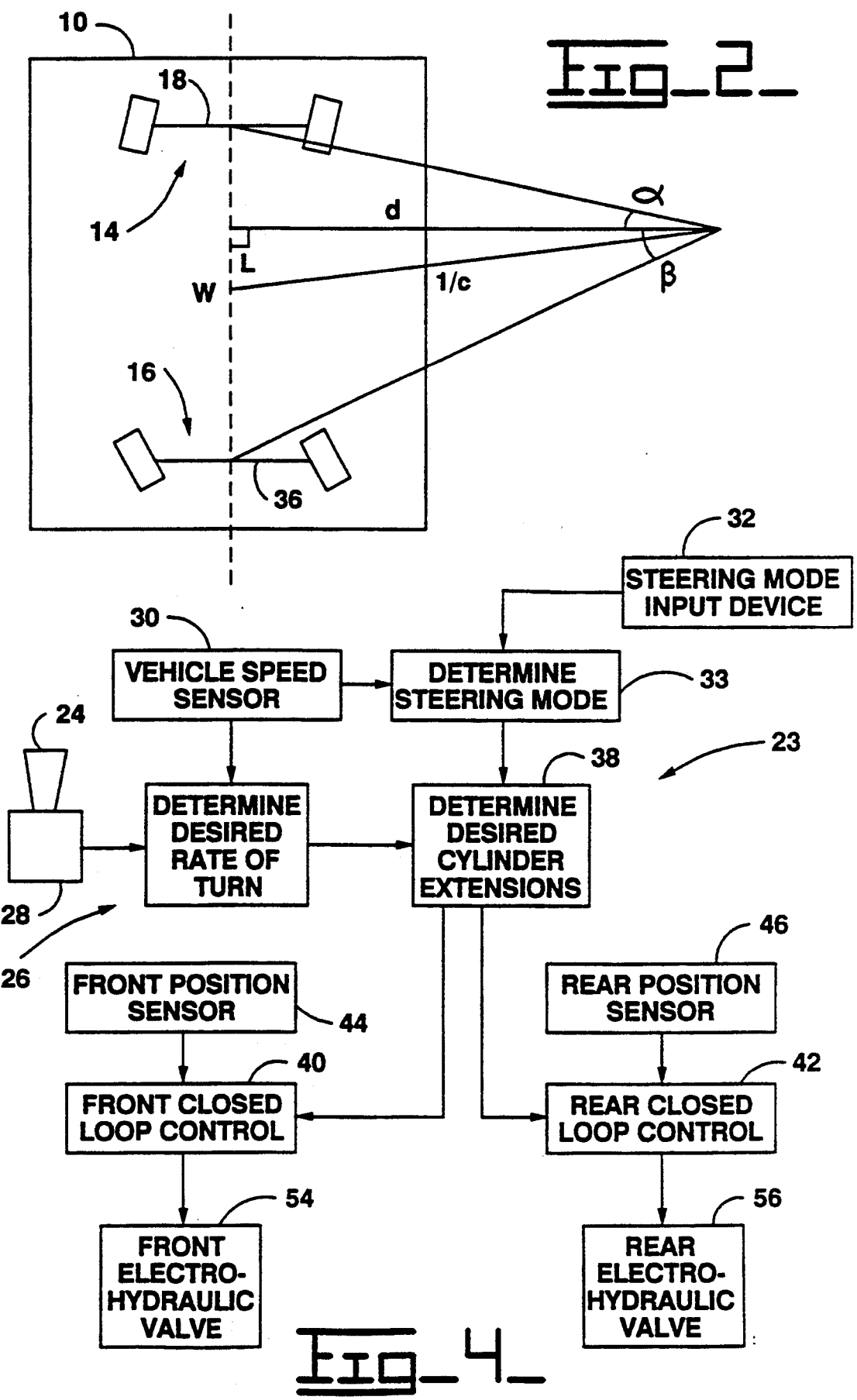
FIG. 2 is a geometrical illustration of distances and angles determined by the rate of turn and steering modes of a vehicle.

It can be shown empirically that a reasonable approximation of the actual center of turn in the cramp steering mode can be found by using the average turn angles of the front and rear wheels 14,16 instead of a turn angle for each of the wheels 12 as shown in FIG. 1. Referring now to FIG. 2, rather than drawing a line from each of the front wheels 14, a line corresponding to the average turn angle of the front wheels 14 is drawn from the center of the axle connecting the front wheels 14. Likewise, a line corresponding to the average of the turn angles of the rear wheels is drawn from the center of the axle connecting the rear wheels 16. The intersection of these two lines is shown and provides a reasonable approximation of the center of turn of the vehicle 10.

Referring primarily to FIG. 2, the instantaneous path of the vehicle 10 is described in terms of curvature, c, and perpendicular length, L. The curvature is equivalent to the inverse of the radius of the vehicles path. Perpendicular length, L, is defined as the distance from a center point, which is located on the vehicle centerline and is equidistant from the axles, to a point on the vehicle centerline at which a line emanating from the center of turn forms a perpendicular angle with the vehicle centerline. The relationship between the average front and average rear steering angles and curvature, c, and perpendicular length, L, can be seen by reference to the drawings and the following equations:

$$d = (1/c^2 - L^2)^{\frac{1}{2}}$$

where
d is the length of the line perpendicular to the centerline of the vehicle and extending to the center of turn.

$$alpha = atan((w/2 - L)/d)$$

where
alpha is the average front turning angle;
and
w is the distance from the front axle to the rear axle.

$$beta = atan((w/2 + L)/d)$$

where
beta is the average rear turning angle.

Figure 3:
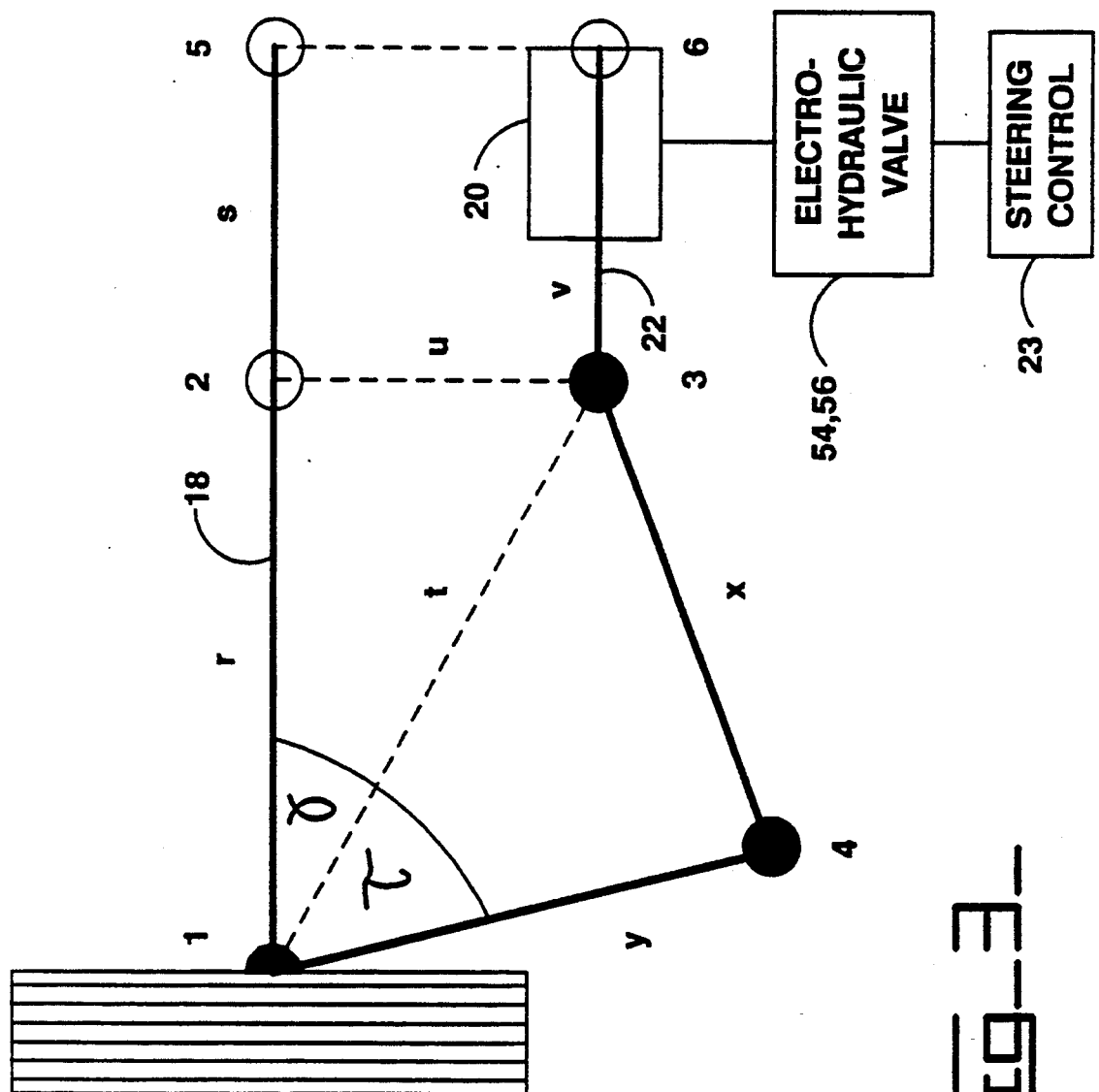
FIG. 3 is a diagrammatic illustration of a portion of an Ackerman steering apparatus included in an embodiment of the invention.

Referring now to FIG. 3, an Ackerman steering linkage 19 is shown for the front left wheel. While the steering linkage is shown and described with respect to only the left front wheel, it should be appreciated that the steering linkages for all of the steerable wheels 12 are constructed and operate in an analogous fashion. A portion of the front axle 18 is shown extending between points 1 and 5. A front steering cylinder 20 includes a cylinder rod 22 shown to be extending between points 6 and 3. Advantageously, the steering cylinder 20 is a double rod ended cylinder wherein the cylinder rod 22 has two ends and extends entirely through the cylinder. This arrangement allows both rod ends to move in substantially the same direction. Therefore, one of the rod ends is retracted as the other rod end is extended, and vice versa. This arrangement allows both of the front wheels 14 to be steered with a single cylinder 20 since one of the rod ends is connected to the left front wheel and the other rod end is connected to the right front wheel. The cylinder rod 22 is connected to the left front wheel via links having lengths corresponding to x and y in FIG. 3 and extending to and between points 3, 4, and 1. While the invention is described in conjunction with hydraulic steering cylinders, it should be appreciated that other steering control mechanisms may be used, for example, electromechanical devices or rack and pinion steering systems.

Point 6 is defined as the center of the steering cylinder 20. Accordingly, as the cylinder rod end is extended or retracted, the length from point 3 to point 6 becomes longer or shorter, respectively. Point 2 is defined as the point on the axle which forms a right triangle with points 1 and 3; therefore, point 2 moves along the front axle 18 as the cylinder rod end corresponding to point 3 is extended or retracted. The distance from point 1 to point 5, r+s, is defined as the distance from the left front wheel to the centerline of the vehicle. The distance from point 1 to point 2, r, is equal to distance r+s minus the distance from point 3 to point 6, x. The distance from point 2 to point 3, u, is a known constant since the front axle 18 and the front steering cylinder 20 extend in substantially parallel directions. From the Pythagorean Theorem, it follows that the distance form point 1 to point 3, t, is equivalent to the square root of the sum of the squares of r and u. The linkage is further described by the following equations:

$$gamma = atan(u/r)$$

where
gamma is the angle formed by lengths r and t;
u is the distance from point 2 to point 3; and
r is the distance from point 1 to point 2.

$$tau = acos((t^2 + y^2 - x^2)/(2*t*y))$$

where
tau is the angle formed by lengths t and y;
t is the distance from point 1 to point 3;
y is the distance from point 1 to point 4;
and
x is the distance from point 3 to point 4.

$$turn\ angle = gamma + tau - offset$$

where
turn angle is the angle to which the left front wheel is turned from a straight-ahead direction; and
offset is the sum of gamma and tau when the left front wheel is in the straight-ahead position, whereby the turn angle of the left front wheel in this embodiment is positive for right-hand turns and negative for left-hand turns. As noted above, the turn angle for the other steerable wheels is determined in an analogous manner.

FIG. 4 is a block diagram illustrating the general operation of the steering control. A steering input device 24 is provided for producing a steering signal that is indicative of the operator's desired rate and direction of turn for the vehicle. The steering input device 24 is movably mounted to the vehicle 10 at an operator's station (not shown). In the preferred embodiment, the steering input device 24 includes a lever that is movable by the operator through a plurality of positions which each correspond to a desired rate of turn of the vehicle. It should be understood, however, that the invention would work equally well with a conventional steering wheel in place of the lever. The steering input device is connected to a means 26 for producing a curvature signal. The curvature signal producing means preferably includes a rotary potentiometer 28 which creates a pulse width modulated signal in which the duty cycle of the signal is determined by the position of the steering input device 24. Other signal producing devices could easily be used in place of the rotary potentiometer 28, e.g. linear potentiometers or other devices capable of varying an electrical signal in response to the position of a physical member.

In the preferred embodiment, a vehicle speed sensor 30, of a type well-known in the art, is connected to the vehicle 10 to sense the speed of the vehicle and responsively produce a speed signal. The speed signal is received by the curvature signal producing means which adjusts the curvature signal in response to the speed of the vehicle 10. As illustrated in FIG. 5, the gain of the curvature signal is directly proportional-to vehicle speed. At low speed, the rate of turn associated with a given lever position is substantially greater than when the vehicle 10 is travelling at a relatively high speed. While the device for adjusting the curvature signal in response to vehicle speed is advantageously included in the preferred embodiment, it is not required.

A steering mode input device 32 is also connected to the vehicle 10 at the operator's station (not shown). The steering mode input device 32 includes a plurality of buttons, switches, or similar input devices which correspond to the steering modes in which the vehicle is capable of operating. While many steering modes and combinations of steering modes may be envisioned, the preferred embodiment includes a front steering mode in which the vehicle steers with the front wheels 14 only, a rear steering mode in which the vehicle steers exclusively with the rear wheels 16, a cramp steering mode in which the vehicle 10 steers by turning the front and rear wheels 14,16 in opposite directions, a crab steering mode in which the vehicle 10 steers by turning the front and rear wheels 14,16 in the same direction, and an automatic mode in which a steering mode selector 33 determines the steering mode in which the vehicle is to operate. While the preferred embodiment includes all of the above modes, the present invention would work equally well with vehicles using any combination of the above modes or even other steering modes not described.

While in the automatic steering mode, the steering mode selector 33 receives the speed signal and responsively determines the desired steering mode 34. For example, the steering control 23 selects the rear steering mode to provide orientation changes at very low speeds, the cramp steering mode to provide tight turning at moderate speeds, and the front steering mode at relatively high speeds to allow steering similar to that of an automobile. When one of the other steering modes is selected, the steering mode selector 33 maintains the steering control 23 in the chosen mode.

The magnitude of the perpendicular length, L, is dependent upon the steering mode in which the vehicle 10 is operating. In the front steering mode, the perpendicular, d, intersects the vehicle centerline at the rear axle. In the rear steering mode, the perpendicular, d, intersects the vehicle centerline at the front axle 18. In the preferred embodiment, the perpendicular intersects the vehicle centerline between the front and rear axles 18,36 when the vehicle is operating in the cramp steering mode. The exact location of the intersection while in the cramp steering mode is determined by the turning characteristics of the front and rear wheels 14,16 and will be further described below. The perpendicular length, L, is defined as the distance from a reference point, preferably a point being equidistant from the front and rear axles 18,36, to the point at which the perpendicular, d, intersects the vehicle centerline.

The desired cylinder extension for each of the steering cylinders is determined 38 in response to the perpendicular length, L, and the curvature signal. The steering control 23 includes a two-dimensional look-up table which allows the steering control 23 to determine the desired cylinder extension, and therefore desired turn angle, that is associated with each combination of perpendicular length, L, and curvature signal within their practical ranges. The cylinder extensions found at the addresses being defined by the perpendicular length and curvature signal are determined by reference to the above described equations. The look-up table is of a type well-known in the electronics art which interpolates between the discrete values in the table to improve resolution and will not be further discussed.

Due to symmetry, the size of the look-up table is reduced by noting that the cylinder extension required for left and right turns differs only in direction and not in magnitude. This allows both left and right turns to be made with a single look-up table. The look-up table can be further reduced by noting that if a positive perpendicular length, L, is associated with the perpendicular, d, being closer to a given axle than the other axle, and vice versa, then a positive perpendicular length, L, for a given axle has a corresponding perpendicular length, L, associated with the other axle which is opposite in sign but equal in magnitude.

In response to the desired cylinder extension obtained from the look-up table, the steering control 23 produces a cylinder extension signal for each of the front and rear steering cylinders which corresponds to the desired turn angle for the front and rear wheels, respectively. It should be understood that in certain of the modes described above, the desired turn angle for the front or the rear wheels may correspond to a straight-ahead position.

The cylinder extension signals for the front and rear wheels 14,16 are then processed by respective closed loop controls 40,42. The closed loop control of the preferred embodiment is illustrated in detail in FIG. 6. Position sensors 44,46 are connected to the front and rear steering cylinders, respectively, and produce position signals corresponding to the present turn angle of the respective wheels. In the preferred embodiment, the position cylinders 44,46 are RF sensors disposed within the steering cylinders, but it should be understood that any position sensor that is capable of determining the extension of a steering cylinder can be used in conjunction with this invention. The difference between the position signal and the cylinder extension signal is determined and the resulting difference signal is differentiated 48 along one path and compensated 50 for undesirable signal characteristics along a second path. The resulting differentiated and compensated signals are summed to form a steering signal which is typically defined by a non-linear characteristic. As such, the steering signal is linearized 52 prior to being sent to its respective electro-hydraulic valve 54 which controls the flow of hydraulic fluid to the steering cylinder. Thus, the steering cylinder is caused to extend or retract the cylinder rod in response to the desired turn angle differing from the present turn angle.

INDUSTRIAL APPLICABILITY

The operation of an embodiment of the invention is best described in relation to its use in connection with a vehicle 10 having both front and rear steerable wheels 14,16 and a plurality of steering modes in which the vehicle steers with various combinations of the steerable wheels.

By way of example, it is assumed that the vehicle 10 is currently operating in the cramp steering mode in which the vehicle is being steered with the front wheels 14 being turned in one direction and the rear wheels 16 being turned in the opposite direction. It is further assumed that either the operator then selects the front steering mode via the steering mode input device 32 or the steering control 23 is operating in the automatic mode and has determined that the vehicle should change to the front steering mode in response to a change in vehicle speed.

The steering control 23 obtains the curvature signal corresponding to the desired rate of turn of the vehicle 10 and modifies this signal in response to the speed signal. The steering control 23 determines the perpendicular lengths, L, associated with the cramp steering mode and the front steering mode. The perpendicular length, L, associated with the cramp steering mode is incrementally modified to a value being substantially closer to the perpendicular length of the front steering mode. The steering control 23 continues to incrementally change the perpendicular length, L, until it is equal to the perpendicular length associated with the front steering mode. This allows the vehicle to gradually change from the cramp steering mode to the front steering mode.

In the preferred embodiment, the rear wheels 16 are capable of turning substantially sharper than the front wheels 14. It is therefore advantageous to choose the perpendicular length, L, associated with the cramp steering mode such that when the steering mode is changed, the front and rear wheels 14,16 reach their desired turn angles at the same time.

Since the vehicle can turn substantially sharper while in the cramp steering mode than in the front steering mode, it is possible that the curvature signal corresponds to a rate of turn that the vehicle cannot attain while in the front steering mode. Therefore, the steering control 23 determines whether the cylinder extension signal corresponds to a turn angle that is beyond the physical limits of the vehicle when the perpendicular length is incremented. If the cylinder extension signal is beyond this limit, the non-incremented perpendicular length will be used to determine the actual cylinder extension signal. In this way, the vehicle will completely change to the front steering mode if the steering input device 24 is in a position corresponding to a rate of turn within the turning capabilities of the vehicle in the front steering mode. However, if the steering input device 24 is outside this range, the transition to the front steering mode is temporarily suspended in an intermediate mode between the cramp steering mode and the front steering mode. As the operator moves the steering input device 24 closer to the front steering range, the vehicle will continue to progressively change to the front steering mode by straightening the rear wheels 16. In this way, the steering control 23 will not allow the vehicle to make a complete transition to the front steering mode if it would result in a change in the rate of turn of the vehicle which the operator is currently indicating with the steering input device 24. Once the steering input device 24 is returned to the front steering range, the vehicle will be entirely in the front steering mode and will remain in this mode until the operator or steering control 23 determines that a steering mode change is required. After the steering control 23 has entirely changed steering modes, the rate of turn of the vehicle 10 will be limited by the physical constraints of the vehicle corresponding to that steering mode and will not be allowed to exceed these limits even though the steering input device 24 may be moved to a position corresponding to a greater rate of turn.

While only one steering mode change has been described, it should the understood that other steering mode changes occur in an analogous manner. The steering control 23 does not attempt to maintain the current rate of turn while transitioning to and from the crab steering mode. When transitioning to crab steering, the appropriate wheels are turned to cause both the front and rear wheels 14,16 to be aligned in substantially the same direction. While rate of turn is not considered in this transition, the direction of travel is maintained. Similarly, while transitioning from the crab steering mode the direction of travel is maintained and the appropriate wheels are turned to correspond to the desired steering mode.

The closed loop control 40,42 receives the cylinder extension signal and the cylinder position signal and responsively produces a steering signal based on the difference between the cylinder extension signal and the cylinder position signal. The steering signal is linearized and subsequently causes the electro-hydraulic valve 54,56 to change the extension of the steering cylinder such that the respective wheels are turned towards the desired turn angle.

In one embodiment of the present invention, the steering control 23 computes the requested flow of hydraulic fluid to both the front and the rear steering cylinders and the available flow of hydraulic fluid which is a function of engine speed. If the requested flow is greater than the available flow, the flow to the front and rear steering cylinders is proportionately reduced to be equal to the available flow.

Other aspects, objects, and advantages of this invention can be obtained from a study of the drawings, the disclosure, and the appended claims.

We claim:

1. An apparatus (23) for changing steering modes in a vehicle (10) having a plurality of steerable wheels (12) and a steering input device (24) being connected to said vehicle (10) and movable to and between a plurality of positions, each of said positions being associated with a desired rate of turn of the vehicle (10), comprising:
    a previous steering mode;
    means (33) for selecting a desired steering mode having a predetermined range of rates of turn;
    a first subset (12,14,16) of the plurality of steerable wheels (12), said first subset (12,14,16) corresponding to the previous steering mode;
    a second subset (12,14,16) of the plurality of steerable wheels (12), said second subset (12,14,16) corresponding to said desired steering mode; and
    means (38) for transitioning from steering exclusively with said first subset (12,14,16) of steerable wheels to steering exclusively with said second subset (12,14,16) of steerable wheels while the steering input device (24) is in any of said plurality of positions, wherein said transitioning means (38) includes means for preventing a complete transition from said previous steering mode to said desired steering mode in response to the desired rate of turn of the vehicle being outside said predetermined range of rates of turn.

2. An apparatus (23), as set forth in claim 1, including a means (30) for sensing a speed of the vehicle (10) and means (26) for producing a curvature signal in response to the position of the steering input device (24) and the speed of the vehicle (10).

3. An apparatus (23), as set forth in claim 2, wherein said curvature signal producing means (26) includes means (28) for producing a pulse width modulated signal in response to the position of the steering input device (24).

4. An apparatus (23), as set forth in claim 1, wherein said vehicle (10) includes a crab steering mode in which all of said steerable wheels (12) are directed in substantially the same direction.

5. An apparatus (23), as set forth in claim 1, wherein said transitioning means (38) determines a desired turn angle for each of said steerable wheels in response to said desired steering mode, said previous steering mode, and the position of the steering input device and including:
    means (44,46) for determining a current turn angle of each of said steerable wheels (12);
    means (40,42) for producing a steering signal in response to said desired turn angle and said current turn angle.

6. An apparatus (23), as set forth in claim 5, including a first perpendicular distance corresponding to said previous steering mode and having a first predetermined magnitude, and a second perpendicular distance corresponding to said desired steering mode and having a second predetermined magnitude, and wherein said transitioning means (38) calculates a third perpendicular distance having a magnitude between said first and second predetermined magnitudes, and produces a desired turn angle in response to said third perpendicular distance and said curvature signal.

7. An apparatus (23) for changing steering modes in a vehicle (10) having a plurality of steerable wheels and a steering input device (24) being connected to said vehicle (10) and movable between a plurality of positions, each of said positions being associated with a desired rate of turn of the vehicle (10), comprising:
    a previous steering mode;
    means (33) for selecting a desired steering mode;
    means (26) for producing a curvature signal in response to the position of said steering input device (24);
    a first perpendicular distance corresponding to said previous steering mode and having a first predetermined magnitude;
    a second perpendicular distance corresponding to said desired steering mode and having a second predetermined magnitude;
    means (38) for calculating a third perpendicular distance having a magnitude between said first and second predetermined magnitudes; and means (40,42) for producing a steering signal in response to said curvature signal and said magnitude of the third perpendicular distance.

8. An apparatus (23), as set forth in claim 7, including means (32) for obtaining operator input and responsively producing an input signal, and means (30) for sensing a speed of the vehicle (10) and responsively producing a vehicle speed signal; and wherein said means (33) for selecting said desired steering mode includes a manual mode responsive to operator input and an automatic mode responsive to said vehicle speed signal.

9. An apparatus (23), as set forth in claim 8, including means (26) for modifying said curvature signal in response to said vehicle speed signal.

10. An apparatus (23), as set forth in claim 7, wherein said steering signal producing means (40,42) determines a desired turn angle and a current turn angle for each of said steerable wheels (12).

11. An apparatus (23) for changing steering modes in a vehicle (10) having a plurality of steerable wheels (12) and a steering input device (24) being movably connected to said vehicle (10), comprising:
a previous steering mode;
means (32) for obtaining operator input and responsively producing an input signal;
means (30) for sensing a speed of the vehicle (10) and responsively producing a vehicle speed signal;
means (33) for selecting a desired steering mode, said selecting means (33) including a manual mode being responsive to said input signal and an automatic mode being responsive to said vehicle speed signal;
a first subset (12,14,16) of the plurality of steerable wheels, said first subset (12,14,16) corresponding to said previous steering mode;
a second subset (12,14,16) of the plurality of steerable wheels, said second subset (12,14,16) corresponding to said desired steering mode;
means (26) for producing a curvature signal in response to movement of the steering input device;
means for controllably transitioning from steering exclusively with said first subset (12,14,16) of steerable wheels to steering exclusively with said second subset (12,14,16) of steerable wheels, said transitioning means (38) includes a first perpendicular distance corresponding to said previous steering mode and having a first predetermined magnitude and a second perpendicular distance corresponding to said desired steering mode and having a second predetermined magnitude, said transitioning means (38) calculates a third perpendicular distance having a magnitude between said first and second predetermined magnitudes; and
means (40,42) for producing a steering signal in response to said curvature signal and said magnitude of the third perpendicular distance.

12. An apparatus (23), as set forth in claim 11, wherein said curvature signal producing means (26) modifies said curvature signal in response to said vehicle speed signal.

13. An apparatus (23), as set forth in claim 11, including:
a front pair (14) of steerable wheels being connected to an Ackerman steering apparatus (19) and being steerable in response to said steering signal; and
a rear pair (16) of steerable wheels being connected to an Ackerman steering apparatus (19) and being steerable in response to said steering signal.

14. A method for transitioning between steering modes for a vehicle (10) being steerable at a plurality of rates of turn and having a plurality of steerable wheels, a plurality of steering modes, and a steering input device (24) being movable to and between a plurality of positions, each of said positions being associated with a desired rate of turn of the vehicle (10), said method comprising the steps of:
selecting a desired steering mode;
transitioning from a previous steering mode to one of an intermediate steering mode and the desired steering mode while the steering input device is in any of the plurality of positions; and
causing the rate of turn of the vehicle (10) to be substantially equal to the desired rate of turn throughout the transition.

15. A method, as set forth in claim 14, including the steps of:
determining a current steering angle of each of the steerable wheels (12);
determining a desired turn angle for each of the steerable wheels (12) in response to the desired steering mode, the previous steering mode, and the position of the steering input device (24); and
producing a steering signal in response to the desired turn angle and the current turn angle.

16. A method for transitioning between steering modes for a vehicle (10) being steerable at a plurality of rates of turn and having a plurality of steerable wheels, a plurality of steering modes, and a steering input device (24) being movable to and between a plurality of positions, each of said positions being associated with a desired rate of turn of the vehicle (10), said method comprising the steps of:
selecting a desired steering mode;
producing a curvature signal in response to the position of the steering input device (24);
calculating a perpendicular distance having a magnitude between the magnitude of a first perpendicular distance corresponding to a previous steering mode and the magnitude of a second perpendicular distance corresponding to the desired steering mode; and
producing a steering signal in response to the curvature signal and the magnitude of the calculated perpendicular distance.

17. A method, as set forth in claim 16, including the steps of:
sensing a vehicle speed and responsively producing a vehicle speed signal; and
modifying the curvature signal in response to the vehicle speed signal.

* * * * *